United States Patent [19]
Ellard

[11] Patent Number: 5,999,937
[45] Date of Patent: Dec. 7, 1999

[54] SYSTEM AND METHOD FOR CONVERTING DATA BETWEEN DATA SETS

[75] Inventor: Scott Ellard, Fremont, Calif.

[73] Assignee: Madison Information Technologies, Inc., Chicago, Ill.

[21] Appl. No.: 08/870,841

[22] Filed: Jun. 6, 1997

[51] Int. Cl.$^6$ .................................................... G06F 17/30
[52] U.S. Cl. ................... 707/101; 707/3; 707/4; 707/6; 707/7; 707/100; 707/102
[58] Field of Search ................... 707/3, 4, 6, 7, 707/100, 101, 102; 705/8, 28, 34, 38, 41, 43; 395/200.33, 200.57, 200.59; 348/7

[56] References Cited

U.S. PATENT DOCUMENTS

| | | | |
|---|---|---|---|
| 5,774,661 | 6/1998 | Chatterjee | 395/200.33 |
| 5,774,883 | 6/1998 | Anderson | 705/38 |
| 5,787,431 | 7/1998 | Shaughnessy | 707/100 |
| 5,790,173 | 8/1998 | Strauss | 348/7 |
| 5,805,702 | 9/1998 | Curry | 380/23 |

*Primary Examiner*—Thomas G. Black
*Assistant Examiner*—Diane D. Mizrahi
*Attorney, Agent, or Firm*—Gray Cary Ware & Freidenrich

[57] ABSTRACT

A customizable system and method for transferring data between an input data set and an output data set having possibly different data formats is provided comprising receiving data from an input data set, the data having a predetermined data format, converting the data from the input data set into data having a format compatible with an output data set, the converting being conducted by a data exchanger and one or more customizable configuration tables for controlling the data exchanger to convert data from a first user defined format to a second user defined format, and outputting the output data to the output data set. A system and method for transferring data between an input data set and an output data set is also provided, comprising receiving data from an input data set, the data having a predetermined data field format and a predetermined data record format, converting the data fields from the input data set into data fields having a format compatible with an output data set, converting the data records from the input data set into data records having a format compatible with the output data set, and outputting the output data to the output data set.

22 Claims, 3 Drawing Sheets

SYSTEM AND METHOD FOR CONVERTING DATA BETWEEN DATA SETS

BACKGROUND OF THE INVENTION

This invention relates generally to a system and method for processing data contained in a data set and in particular to a system and method for transferring and converting data between one or more data sets having possibly different data formats and possibly requiring different special purpose conversion routines.

A computer repository for digital information, which may be interchangeable called a database, a data source or a data set, may have information about a variety of entities, such as patients in a hospital or parts in a warehouse. The information within data set may be contained in one or more data fields wherein each data field may each have its own unique data format. For example, a date data field may have a different format that a street address data field. In addition, each different data set may have data records with different data formats. However, it is often desirable to be able to export data from a particular data set into a software application as well as import data into the data set from an external data set without significant human intervention. It would take a significant amount of time to manually write a custom software application to transfer and convert data between different data sets. In addition, the integrity of the data may be jeopardized during the manual re-entry of the data because operator entry errors may be introduced into the data. Thus, it is desirable to provide a system for automatically converting data from a first data format to a second different data format.

There are a number of conventional systems and methods for transferring (e.g., importing and exporting) data between a first data set and another data set having possibly different data formats. One such system is a typical import/export software tool provided with most modern database or word processing applications. These import/export tools permit a user to import or export the data from the word processor or database into a certain predetermined number of predefined output formats, such as tab delimited data fields, SQL data records or a particular word processor format. For example, a word processing application may convert documents into a different data format that is compatible with another word processing application. These tools only permit the user to convert the data into certain predefined data formats. They do not permit a user to create a new customized data format and do not permit the data conversion routines to be customized for a particular type of data. In addition, a separate conversion routine is typically needed for each conversion instead of a customizable conversion process which may handle multiple different conversions. Some conventional tools also attempt to convert non-normalized data into normalized data which is typically used for modern database applications.

These conventional import/export tools also permit the user to convert each individual input data record into a single output data record. It is desirable to be able to generate a plurality of output data records from a single input data record or a single output record from a plurality of input data records. For example, the input data record for a merchant may be single data record containing information about the customer purchases for a day from the store, including invoice numbers, the name and address of the customer and the quantity and price of the products purchased by each customer. The store owner may wish to separate that single input data record into a plurality of output data records, such as a first data record containing information about the invoice numbers, a second data record containing information about the product purchases for inventory control, and a third data record containing information about the customer for a mailing list. Conventional import/export tools do not permit multiple output data records to be generated from a single input data record and the process of writing a custom software application to perform the conversion and transfer of data is time consuming.

It is also desirable to be able to customize the import/export tool for a particular type of data. The conventional import/export tools do not permit the tool to be customized for a particular type of data. If a data conversion to a new data format is needed, the user must hire a programmer to write a custom conversion program for the new data format. In addition, none of these conventional import/export tools have a conversion application or configuration data that may be used to customize the conversion application for a particular type of data.

Thus, there is a need for a system and method for transferring data between a first data set and a second data set having possibly different data formats which avoid these and other problems of known systems and methods, and it is to this end that the present invention is directed.

SUMMARY OF THE INVENTION

In accordance with the invention, a system and method for transferring data between data sets is provided in which the system transfers data between one or more input data sets, possibly having different data formats and one or more output data sets that also possibly have a different data format from the input data sets. The system may also permit the user to generate special purpose software conversion routines for a particular data set. The system may include a processing application that may be customized using configuration data to convert and transfer any type of data into any other type of data. The system may also contain a library of standard conversion routines as well as other customized conversion routines that may be entered into the system by the operator of the system.

The system may also convert both data records and data fields of input data. During conversion of a data, for example, a single input data record may be converted into a plurality of output data records or a plurality of input data records may be converted into a single output data record. During conversion of a data field, for example, the lowercase characters in the input field may be converted to uppercase characters, the characters may be truncated, and two data fields may be concatenated together. The system may also convert data records from a plurality of different input data sets having different data formats to a plurality of output data sets having different data formats by configuring the system to handle all of the necessary conversions and queuing the plurality of data records into the system.

In accordance with the invention, a system and method for transferring data between a first data set and a second data set having possibly different data formats is provided comprising receiving data from an input data set, the data having a predetermined data format, converting the data from the input data set into data having a format compatible with an output data set, the converting being conducted by a converting engine and one or more customizable configuration tables for controlling the converting engine to convert data from a first user defined format to a second user defined format, and outputting the output data to the output data set.

In accordance with another aspect of the invention, a system and method for transferring data between an input data set and an output data set having possibly different data formats is also provided, comprising receiving data from an input data set, the data having a predetermined data field format and a predetermined data record format, converting the data fields from the input data set into data fields having a format compatible with an output data set, converting the data records from the input data set into data records having a format compatible with the output data set, and outputting the output data to the output data set.

DETAILED DESCRIPTION OF A PREFERRED EMBODIMENT

The invention is particularly applicable to a system and method for converting and transferring data from several data sets, e.g., of patient records, having different data formats into a target data set having yet another data format. It is in this context that the invention will be described. It will be appreciated, however, that the system and method in accordance with the invention has greater utility.

Figure 1:
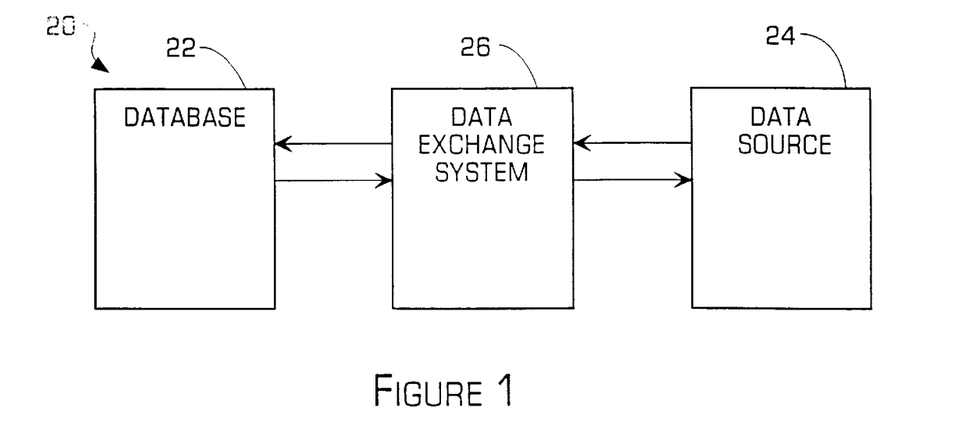
FIG. 1 is a block diagram illustrating an overall system for transferring data between a first data set and a second data set in accordance with the invention.

FIG. 1 is a block diagram illustrating an overall data exchange system 20 for transferring and converting data between a first data set 22 that may be a database and a second data set 24 external to the database. The database 22 may have a first data format while the data set 24 may have a second different data format. The data exchange system converts from the first data format of the database to the second different data format of the data set for data being transferred to the second data set. The data exchange system may be a software application being executed by a computer system. In addition, the data exchange system also converts from the second data format of the second data set to the first data format of the database for data transferred from the second data set to the database. The data exchange system may have a plurality of standard data conversion routines which may perform typical data conversion tasks, such as converting all lowercase words to uppercase words or removing extra punctuation from a data field. To handle customized data formats, the data exchange system may also have a plurality of customized conversion routines that convert data between non-standard data formats. The data exchange system may convert both data fields and data records to different formats. For example, the data exchange system may convert a single input data record into a plurality of output data records as described below with reference to FIG. 2.

The data exchange system may also receive input data records from a plurality of input data sets wherein each data record may have a different data format. The plurality of input data records may be queued by the data exchange system and, as long as the system has been configured to convert the various data formats, the data exchange system may convert and transfer each data record appropriately without requiring the operator to reconfigure the data exchange system for each different data format. The data exchange system may also receive a plurality of differently formatted data records from different input data sets, convert each of those differently formatted data records and output data records having the same data formatting to an output data set. Thus, the data exchange system may convert one or more input data records having different data formats into one or more output data records which may also have different data formats.

Figure 2:
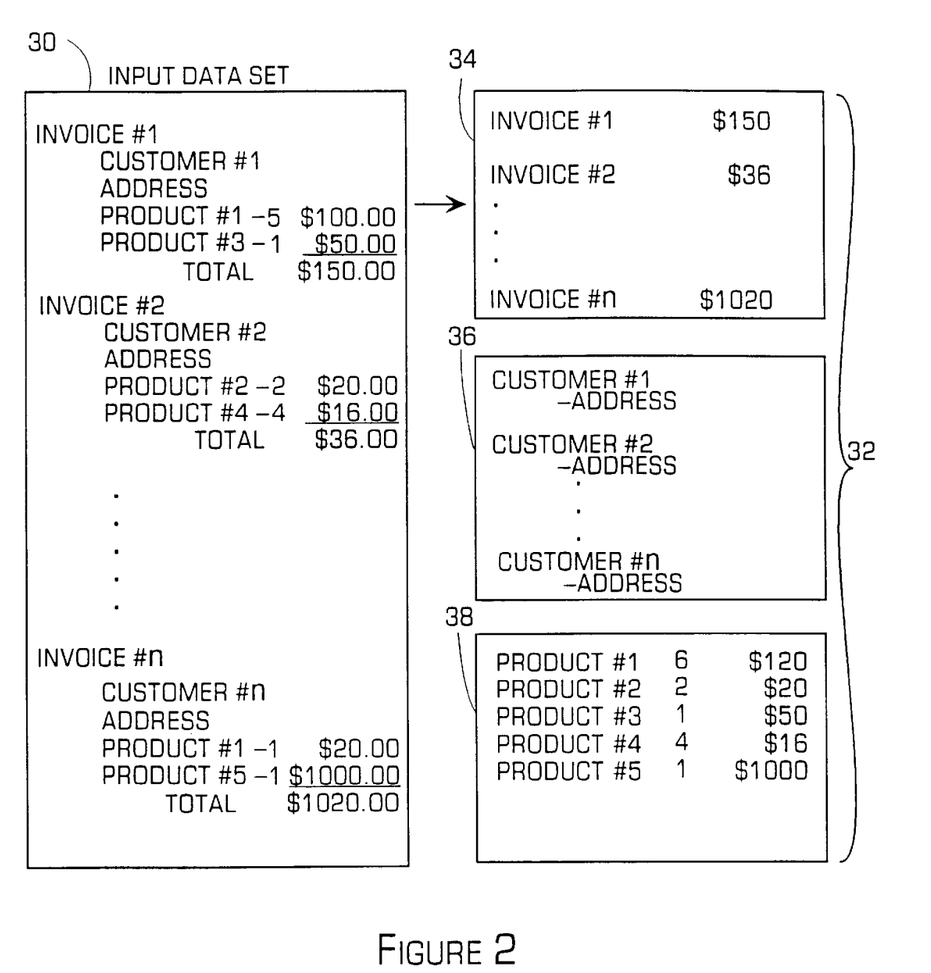
FIG. 2 is a diagram illustrating an example of the conversion of a single data record in an input data set to a plurality of data records in an output file in accordance with the invention.

FIG. 2 is a diagram illustrating an example of the custom conversion of a data record in which a single input data record 30 from an input data set is converted into a plurality of output data records 32 in accordance with the invention. As shown, the single input data record may have a plurality of data fields which contain data about each sale made during the day by a merchant to a number, N, of customers. The entry for each customer in the single data record has a separate invoice number, an address, a list of products purchased, and a total cost of the purchases. The merchant may desire to automatically convert the single input data record into a plurality of output data records 32 which permit the merchant to perform several different tasks, such as totaling his invoices for the day, preparing a customer mailing list for advertisements, and restocking/reordering inventory based on the sales of each product during the day. In this example, the output data records may include an invoice data record 34, a customer data record 36, and an inventory data record 38. In this example, the non-normalized data in the input data set is converted into normalized data. In particular, the output data records contain the normalized data required for each data record.

The invoice data record 34, as shown, includes data from the input data record about the invoice number for each customer and the total spent by each customer during that day. The information from the input data record for these data fields may require some processing of the data in the data fields to reformat the fields or normalize the data. For example, a single data field for a first customer in the output invoice data record may contain the data "Customer # 1 Invoice # 1". The data within this data field in normalized so that the relationship between customer #1 and invoice #1 are known. The invoice data record permits the merchant to determine the total amount of money spent by customers during a particular day. The customer data record 36 may include, for example, only the customer name and address data fields from the input data record so that the merchant can generate a mailing list to send special advertisements to customers who have previously purchased products from the merchant. The inventory data record 38 may include, for example, the product name, the total number of each product sold, which may be calculated from the input data record, and the total amount of money spent on each product which may also be calculated from the input data record. The input data from the input data set may be processed into a format for the inventory data record, such as normalizing the data. In this example, a first data field in the inventory data record may contain data about the customer that purchased the product as well as an indication of the actual product so that the first data field may contain the data "Customer # 1, Product # 1". The inventory data record permits the merchant to determine which products need to re-ordered. Without the data exchanger in accordance with the invention, the merchant would have to manually extract information from the input data record or convert the input data record into some arbitrary data format and attempt to construct the desired output data records, which is very time consuming. Now, more details about the data exchanger system and method in accordance with the invention will be described.

Figure 3:
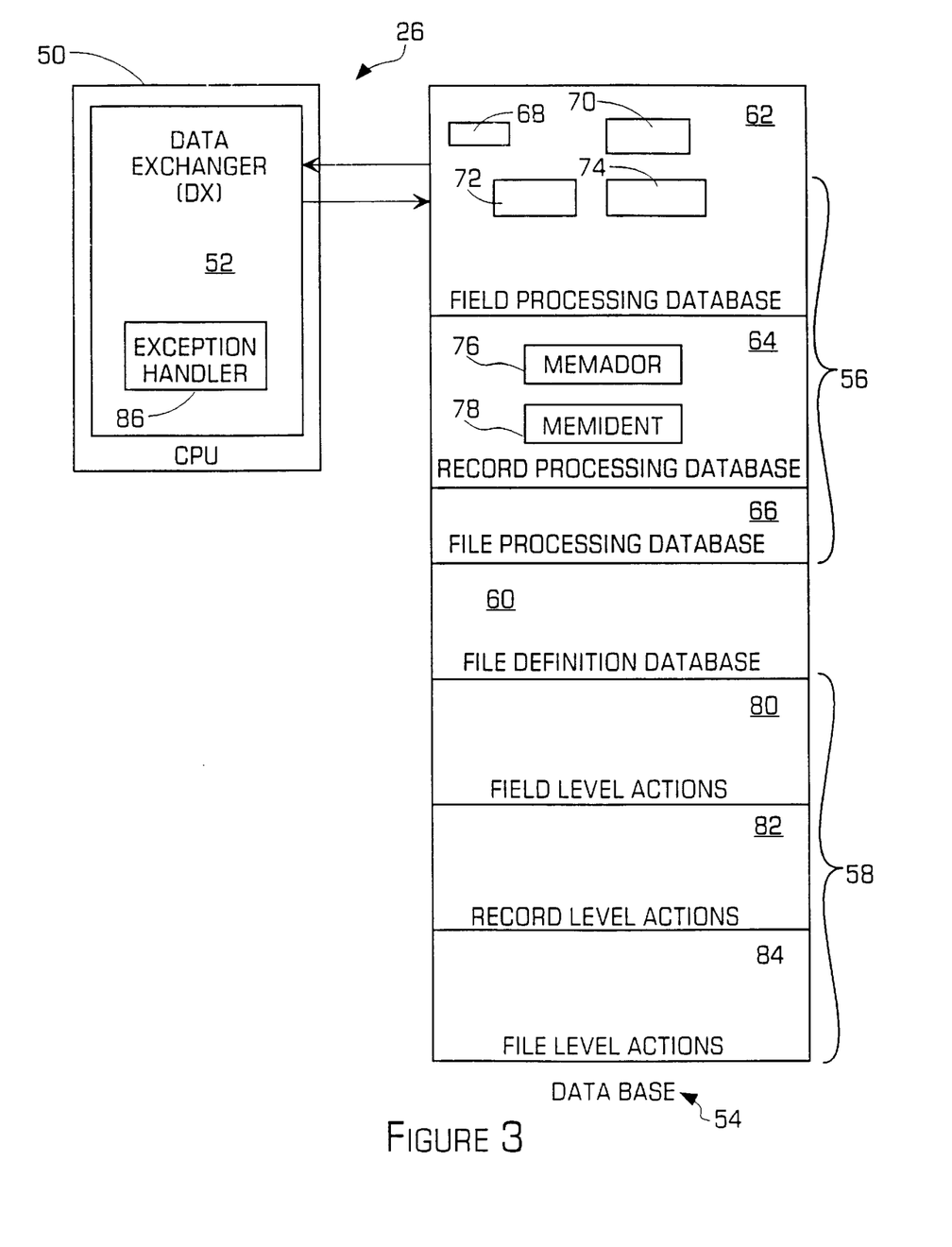
FIG. 3 is a block diagram illustrating more details of the data exchanger system in accordance with the invention shown in FIG. 1.

FIG. 3 is a block diagram illustrating more details of the data exchange system 26 in accordance with the invention. The data exchange system may include a computer system having a central processing unit (CPU) 50 which is executing a data exchanger software application (DX) 52 in accordance with the invention. The DX may also be programmed into a read only memory (ROM) and executed by the central processing unit or may be implemented in hardware circuitry. The data exchange system may further include a configuration database 54, which will be described below. The DX performs the actual data conversion and transfer while the configuration database customizes the DX's conversion operations for one or more particular input data sets and input data formats and one or more particular output data sets and output data formats.

The configuration database may include one or more databases that customize the operation of the DX. In this example, these databases may include an action database 56, an action definition database 58 and a file definition database 60. The action database may contain one or more data conversion commands for input data fields, input data records and input files, as described below. The action definitions database may contain the actual conversion routines for field level conversions, record level conversions and file level conversions that may be executed by the commands in the action database. Thus, the DX may convert an input data set in several different ways. It may convert the input data set on the file level so that the order of converting the file may be specified. It may also convert the format of the data records in the input data set into a data record format for the output file. For example, a single input data record may be converted into a plurality of output data records as described above with reference to FIG. 2 or a plurality of input data records may be converted into a single output data record. The DX may also convert non-normalized data into normalized data. The DX may also convert the data field of the input data set to another format, such as changing an input data field containing characters into an output data field containing integers. The conversion of both data fields and data records in an output data set will be described in more detail below.

The file definition database 60 contains information about each input data set that the DX may convert including information about each data field in the input data set such as each field's length and the contents of each field. The file definition database may be customized for each input data set and may permit the DX to covert any input data set because the format of the input data set may be customized using the file definition database.

The action database 56 may further include a field processing database 62, a record processing database 64 and a file processing database 66 which each contain commands for converting an input data set to an output data set. Each of these databases may contain typical conversion commands as well as specialized conversion commands for a particular input data set or for a particular application. For example, the field processing database 62 may include one or more data field conversion commands, such as a String_To_Integer command 68 which converts a character string into an integer, a Canonical Name Table Look-up command 70 which may look up a canonical name in a table as described below, a CONCAT command 72 which may concatenate two or more character strings into a single character string, or a TOUPPER command 74 which converts lowercase characters to uppercase characters within a data field.

The String_To_Integer command 68, the CONCAT command 72 and the TOUPPER command 74 are typical conversion routines. The Canonical Name Table Look-up conversion command 70, however, is a custom conversion routine that may be used in connection with a specific type of data. For example, a data record containing information about a patient may list the patient's first name as "Bill" whereas the proper canonical name for that person would be "William". The DX, using the Canonical name table look-up conversion routine may look up the nickname "Bill" in a canonical name table associated with the DX system and replace it with the proper name "William". This conversion is a customized conversion used for data records containing information about a patient. Now, the record processing database will be described.

The record processing database 64 may include one or more data record conversion commands that permit the DX to process the data records of an input data set. For example, as shown, the record processing database may include a MEMADDR command 76 and a MEMIDENT command 78. The MEMADDR command, for example, may gather information from a number of data fields in an input data set, such as a street address, city, state, zip code, and country, and form an address record within the output data set. The MEMIDENT command may gather information from a number of data fields in an input data set to generate a output data record containing information about identification numbers for a person, such as a Social Security number. The file processing database will now be described.

The file processing database 66 may include one or more file level processing commands which determine the order in which processing of the data within the input data set may be conducted. For example, the file level processing may include commands indicating that a particular conversion must occur before processing each data record, or after processing each data record. The file processing commands may also separate a conversion into multiple conversion passes through each data record, and each pass may have specific record level or field level processing commands to perform. Thus, the conversion commands performed by the DX may be in a particular order to facilitate the process. For example, the data fields of an input data set should be converted before an output data record is created from the input data set.

The action definition database 58 may include a field level actions database 80, a record level actions database 82, and a file level actions database 84. The field level actions database may include the conversion routines that are called by the field processing commands 68–74 described above and contained in the field processing database 62. Similarly, the record level actions database may include the routines that are called by the record level processing commands 76, 78 described above. The file levels actions database may include routines required by the file level commands described above.

The DX application 52 may further include an exception handler 86 that may detect and notify the operator of the DX system of exceptions (e.g., data conversion errors) that occur during conversion and transfer of the data records. For example, an input data record may be corrupted (e.g., the input data record have a data format different from the data format specified for the input data set) and the exception handler may detect the corrupt data record and notify the operator. The exception handler may also detect corrupt data fields in the input data records (e.g., an input data field should have a date in it, but the data field has some other data in it) and notify the operator of the exception. The exception handler may also detect file level conversion errors.

Figure 4:
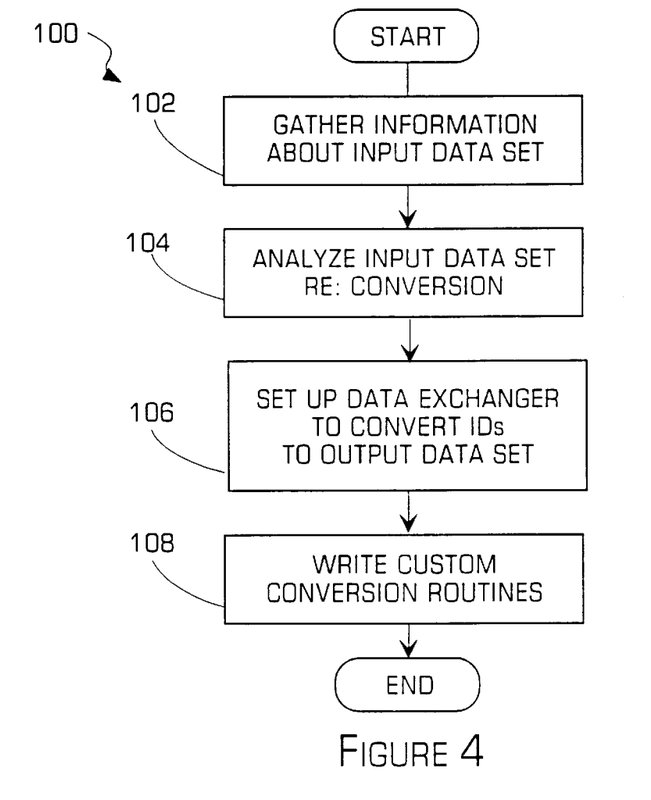
FIG. 4 is a flowchart illustrating a method for configuring the data exchange system for a particular input data set in accordance with the invention.

FIG. 4 is a flowchart illustrating a method 100 for configuring the data exchange system. First, in step 102, information about the input data may be gathered by reviewing data from the input data. Information about the data formats of the data records and data fields in the input data may be determined. In step 104, an operator of the DX may analyze the input data to determine what conversions are required to convert the input data to output data. The conversions may include both data field conversions and data record conversions. In step 106, the operator may enter configuration data into the configuration database to configure the DX to convert the input data to output data. In step 108, the operator of the DX may, as needed, write custom conversion routines or actions for a particular input data set and in particular for a file level, data record level or data field level processing. The custom actions may be stored in the action definition databases 58 shown in FIG. 3. The process of configuring the DX for a particular input data set and output data set is now complete. Once the DX has been configured, the data records from the input data set are transferred, and possibly converted, into data records for an output data set using the file, data record and data field processing commands previously described. Now, an example of the operation of the data exchanger system will be described.

For this example of the operation of the data exchanger system, a variable length record from a laboratory system may have the format set forth in Table 1 below.

define a member in the new output database being created. There may be a record level processing command called MEMHEAD which creates a new member in the output database and requires the following information: 1) a code that identifies the data source which is contained in data field 1; 2) a number the uniquely identifies the member which is in data field 2; 3) an "as-of" timestamp for the record; 4) a timestamp when the record was created; and 5) a code giving the record's status. The first two elements are provided by the input data set and the last three are created by the conversion system.

Data field 3 holds the sex of the member which is a single character numerical code. The output database may use "M" for male and "F" for female so that the numerical code in the input data set is converted into the single alphabetic character code using a field level processing command. The converted code may then be inserted into the output database using the appropriate record level command. Data field 4 contains a member's mother's maiden name. The data field does not require any field level processing and may be inserted into the output database using the appropriate record level command. Data field 5 contains a member's social security number that does not require any field level processing and may be inserted into the appropriate data field in the output database.

Data field 6 of the input data set contains a member's birthday and uses the format "MMDDYY". The output database may use the format "YYYY-MM-DD" so that the data field of the input data set may be converted into the output database format and then inserted into the appropriate data field in the output database. Data fields 7–11 contain a member's home address. The output database may store the address of the member as a single data field. Therefore, the data fields of the input data set may be concatenated together

TABLE 1

| Field No. | Field Name | Description | Field's Start Point | Field's Length | Format | Code Set |
|---|---|---|---|---|---|---|
| 1 | srccode | identifying tag | N/A | N/A | always "labs" | N/A |
| 2 | memrecno | member record number | N/A | N/A | numeric | N/A |
| 3 | sex | member's sex | N/A | N/A | Code | 0=male, 1=female |
| 4 | mother | mother's maiden name | N/A | N/A | Text | N/A |
| 5 | ssn | social security no. | N/A | N/A | nnn-nn-nnn | N/A |
| 6 | birth | member's birthdate | N/A | N/A | MMDDYY | N/A |
| 7 | street1 | home address line 1 | N/A | N/A | Text | N/A |
| 8 | street2 | home address line 2 | N/A | N/A | Text | N/A |
| 9 | city | home city | N/A | N/A | Text | N/A |
| 10 | state | home state | N/A | N/A | Code | USPS two char. code |
| 11 | zip | home zip code | N/A | N/A | Text | N/A |
| 12 | name | member's name | N/A | N/A | First Middle Last | N/A |
| 13 | adtnum | ADT ID no. | N/A | N/A | Numeric | N/A |

Each of these data fields of the input data set is analyzed in order to determine how to convert the data into a second data format. The details in Table 1 may be contained in the file definition database, as described above. The conversion necessary for each data field will be described below.

Data fields 1 and 2 of the input data set contain, respectively, an identifying tag of this type of record (e.g., LABS) and a unique number that identifies this record as belonging to a particular member. These two data fields define a member in the laboratory database and also may to form a single data field which may then be inserted into the appropriate data field of the output database.

Data field 12 of the input data set contains the member's name. The output database may store additional information about the member's name, such as a prefix (e.g., "Ms" or "Mr."), a suffix (e.g., "Jr." or "III"), a separate searchable form of the first, middle and last name (e.g., the white space and punctuation are removed and the characters are converted to uppercase), and a Metaphone form of the last name (e.g., the last name spelled phonetically). Therefore, several data fields may be created from the input data set using field level processing commands and the various data fields may be inserted into the output database. The last data field of the input data set, data field 13, contains a member's identification number which does not require any field level processing and may be inserted into the output database using an appropriate command. Thus, once the above analysis of the input data set has been completed, the data fields, through a combination of field level processing commands and record level processing commands, may be converted by the data exchange system into the format of the output database and transferred into the output database.

While the forgoing has been with reference to a particular embodiment of the invention, it will be appreciated by those skilled in the art that changes in this embodiment may be made without depatying from the principles and spirit of the invention, the scope of which is defined by the appended claims.

I claim:

1. A system for transferring data between an input data set and an output data set, the system comprising:

means for receiving data from an input data set, the input data set having a predetermined input data format including one or more input data fields;

means for converting the received data from the input data set into data having a format compatible with an output data set, the output data set having an output data format including one or more output data fields so that the one or more input data fields are converted into the one or more output data fields;

one or more configuration databases for controlling the converting means to convert the data sets and the associated data fields, wherein the configuration databases include a field processing database, a record processing database, and a file processing database wherein the input data format and the output data format are stored in the configuration databases so that the converting means converts data from any input data set to any output data set based on the data formats stored in the one or more configuration databases; and means for outputting the output data to the output data set.

2. The system of claim 1, wherein said input data set has an input data field format and an input data record format and said output data set has an output data field format and an output data record format, the converting means further comprising means for converting the data fields from the input data set into data fields having a format compatible with an output data set, and means for converting the data records from the input data set into data records having a format compatible with the output data set.

3. The system of claim 1, wherein said converting means further comprises means for performing predetermined data field conversion routines and means for performing user definable data field conversion routines.

4. The system of claim 1, wherein said input data set has an input data record format and said output data set has an output data record format and said converting means comprises means for receiving a data record from the input data set, and means for generating a plurality of data records having the predetermined output data record format from the input data record.

5. The system of claim 1, wherein said input data set has an input data record format and said output data set has an output data record format and said converting means comprises means for receiving an input data set containing one or more data records, and means for generating a single output data set data record from the one or more input data set data records.

6. The system of claim 1, wherein said converting means comprises means for receiving an input data set containing a plurality of data records containing information about a person and means for generating an output data set having a single output data record containing the information about the person.

7. The system of claim 1, wherein said converting means comprises means for receiving an input data set containing a plurality of data fields containing information about a person and means for generating an output data set having a single output data record containing one or more data fields with the information about the person.

8. A system for transferring data between an input data set and an output data set, the system comprising:

one or more configuration databases for storing a plurality of input data formats and output data formats including a first input data format having one or more input data fields and one or more data records and a first output data format having one or more output data fields and one or more data records, wherein the configuration databases include a field processing database, a record processing database, and a file processing database means for receiving data from an input data set, the input data set having the first input data format;

means for converting the data fields from the input data set into data fields having a format compatible with an output data set based on the input and output data formats stored in the configuration databases;

means for converting the data records from the input data set into data records having a format compatible with the output data record format based on the input and output data formats stored in the configuration databases; and means for outputting the output data set containing the predetermined output data field format and the predetermined output data record format in order to convert the data fields and the data records from the input data set format to the output data set format.

9. The system of claim 8, wherein said data records converting means comprises means for receiving a data record from the input data set, and means for generating a plurality of data records having the predetermined output data record format from the input data record.

10. The system of claim 8, wherein said converting means further comprises means for performing predetermined data field conversion routines and means for performing user definable data field conversion routines based on the one or more configuration databases.

11. The system of claim 8, wherein said converting means comprises means for receiving an input data set containing a single data record, and means for generating an output data set containing a plurality of data records.

12. The system of claim 8, wherein said converting means comprises means for receiving an input data set containing a plurality of data records, and means for generating an output data set containing a single output data set data record.

13. The system of claim 8, wherein said converting means comprises means for receiving the input data set containing a plurality of data records with information about a person, and means for generating an output data set containing a single data record with the information about the person.

14. The system of claim 8, wherein said converting means comprises means for receiving an input data set containing a plurality of pieces of identification information about a person in a plurality of input data fields and means for generating an output data set containing an output data record with the identification information about the person.

15. A method for transferring data between an input data set and an output data set, the method comprising:

storing a plurality of input data formats and output data formats in a configuration database including a first input data format having one or more input data fields and one or more data records and a first output data format having one or more output data fields and one or more data records, wherein the configuration databases include a field processing database, a record processing database, and a file processing database receiving data from an input data set, the input data set having the first input data format;

converting the data fields from the input data set into data fields having a format compatible with an output data set based on the input and output data formats stored in the configuration databases;

converting the data records from the input data set into data records having a format compatible with the output data record format based on the input and output data formats stored in the configuration databases; and outputting the output data set containing the predetermined output data field format and the predetermined output data record format in order to convert the data fields and the data records from the input data set format to the output data set format.

16. The method of claim 15, wherein said data records converting comprises receiving a data record from the input data set, and means for generating a plurality of data records having the predetermined output data record format from the input data record.

17. The method of claim 15, wherein said converting further comprises performing predetermined data field conversion routines and performing user definable data field conversion routines based on the one or more configuration databases.

18. The method of claim 15, wherein said converting comprises receiving an input data set containing a single data record, and generating an output data set containing a plurality of data records.

19. The method of claim 15, wherein said converting comprises receiving an input data set containing a plurality of data records, and generating an output data set containing a single output data set data record.

20. The method of claim 15, wherein said converting comprises receiving the input data set containing a plurality of data records with information about a person, and generating an output data set containing a single data record with the information about the person.

21. The method of claim 15, wherein said converting comprises receiving an input data set containing a plurality of pieces of identification information about a person in a plurality of input data fields and generating an output data set containing an output data record with the identification information about the person.

22. A system for transferring data between an input data set and an output data set, the system comprising:

one or more configuration databases for storing a plurality of input data formats and output data formats including a first input data format having one or more input data fields and a first output data format having one or more output data fields, wherein the configuration databases include a field processing database, a record processing database, and a file processing database means for receiving data from an input data set, the input data set having the first input data format as stored in the one or more configuration databases;

means for retrieving the first input data format and the first output data format from the one or more configuration databases;

means for converting the input data set into the output data set based on the data formats retrieved from the one or more configuration databases including the one or more input data fields begin converted into one or more output data fields; and means for outputting the output data set.

* * * * *

UNITED STATES PATENT AND TRADEMARK OFFICE
CERTIFICATE OF CORRECTION

| | | |
|---|---|---|
| PATENT NO. | : 5,999,937 | Page 1 of 1 |
| APPLICATION NO. | : 08/870841 | |
| DATED | : December 7, 1999 | |
| INVENTOR(S) | : Scott Ellard | |

It is certified that error appears in the above-identified patent and that said Letters Patent is hereby corrected as shown below:

Column 1, line 12, replace "interchangeable" with -- interchangeably --;
Column 1, line 15, replace "within data" with -- within the data --;
       line 19, replace "that a street" with -- than a street --;
Column 3, line 42, replace "exchange system" with -- exchange system 26 --;
Column 4, line 20, replace "single data" with -- single input data --;
       line 43, replace "field in normalized" with -- field is normalized --;
       line 64, replace "need to re-ordered" with -- to be reordered --; and
Column 8, line 6, replace "the uniquely identifies" with -- that uniquely identifies --.

Signed and Sealed this
Twenty-third Day of August, 2011

David J. Kappos
*Director of the United States Patent and Trademark Office*